(12) United States Patent
Bach et al.

(10) Patent No.: US 10,016,694 B2
(45) Date of Patent: Jul. 10, 2018

(54) METHOD AND SYSTEM FOR DESIGNING AND PRODUCING A USER-DEFINED TOY CONSTRUCTION ELEMENT

(75) Inventors: Erik Bach, Billund (DK); Thomas Gjørup, Silkeborg (DK)

(73) Assignee: LEGO A/S, Billund (DE)

( * ) Notice: Subject to any disclaimer, the term of this patent is extended or adjusted under 35 U.S.C. 154(b) by 716 days.

(21) Appl. No.: 14/130,434

(22) PCT Filed: Jul. 4, 2012

(86) PCT No.: PCT/EP2012/062975
§ 371 (c)(1),
(2), (4) Date: May 1, 2014

(87) PCT Pub. No.: WO2013/004720
PCT Pub. Date: Jan. 10, 2013

(65) Prior Publication Data
US 2014/0244018 A1 Aug. 28, 2014

(30) Foreign Application Priority Data

Jul. 5, 2011 (DK) .................................. 2011 70361

(51) Int. Cl.
*G05B 19/4099* (2006.01)
*A63H 33/06* (2006.01)
(Continued)

(52) U.S. Cl.
CPC .............. *A63H 33/06* (2013.01); *A63H 33/08* (2013.01); *B29C 64/112* (2017.08);
(Continued)

(58) Field of Classification Search
CPC ............................................. B29L 2031/7278
(Continued)

(56) References Cited

U.S. PATENT DOCUMENTS 3,611,621 A 10/1971 Folson
5,350,331 A 9/1994 Glickman
(Continued)

FOREIGN PATENT DOCUMENTS

JP 2008-541985 A 11/2008
JP 2009-083491 A 4/2009
(Continued)

OTHER PUBLICATIONS

Fleskes, "Making Your Own Bricks: A Look Behind the Scenes at Big Ben Bricks" Brick Journal, Issue 3, vol. 1, Winter 2005 pp. 18-20.*

(Continued)

*Primary Examiner* — Emilio J Saavedra
(74) *Attorney, Agent, or Firm* — Day Pitney LLP

(57) ABSTRACT

A computer-implemented method of generating a digital representation of a user-defined construction element connectable to pre-manufactured toy construction elements of a toy construction system, each pre-manufactured toy construction element comprising a number of coupling elements for coupling the pre-manufactured toy construction element with one or more other pre-manufactured toy construction elements of said toy construction system, the method comprising determining one or more positions for placement of one or more coupling elements to be included in the user-defined construction element; generating, responsive to input by a user indicative of a user-defined shape, a digital representation of a user-defined construction element, the user-defined construction element comprising said one or more coupling elements at said determined one or more positions; providing the digital representation for automated production of said user-defined construction element.

19 Claims, 6 Drawing Sheets

(51) Int. Cl.
*A63H 33/08* (2006.01)
*G06F 17/50* (2006.01)
*B29C 64/112* (2017.01)
*B29L 31/00* (2006.01)

(52) U.S. Cl.
CPC ..... *G05B 19/4099* (2013.01); *G06F 17/5086* (2013.01); *B29L 2031/7278* (2013.01); *G06F 2217/02* (2013.01); *G06F 2217/06* (2013.01); *Y02P 90/265* (2015.11)

(58) Field of Classification Search
USPC .................................................. 700/103, 118
See application file for complete search history.

(56) References Cited

U.S. PATENT DOCUMENTS

| | | | |
|---|---|---|---|
| 5,385,472 A | 1/1995 | Mullin | |
| 5,486,127 A | 1/1996 | Wolfe | |
| 5,769,681 A | 6/1998 | Greenwood et al. | |
| 5,797,784 A | 8/1998 | Wolfe | |
| 5,913,706 A | 6/1999 | Glickman et al. | |
| 5,947,787 A | 9/1999 | Cyrus et al. | |
| 5,951,356 A | 9/1999 | Cyrus et al. | |
| 6,126,506 A | 10/2000 | Rudy | |
| 6,129,605 A | 10/2000 | Cyrus et al. | |
| 2006/0106815 A1 | 5/2006 | Timcenko | |
| 2011/0300772 A1 | 12/2011 | Risvig | |
| 2012/0109591 A1* | 5/2012 | Thompson | G06F 17/50 703/1 |
| 2014/0244018 A1 | 8/2014 | Bach et al. | |

FOREIGN PATENT DOCUMENTS

| | | |
|---|---|---|
| KR | 2011 0069424 A | 6/2011 |
| WO | 2000/041792 A1 | 7/2000 |
| WO | 2000/062137 A1 | 10/2000 |
| WO | 2004/034333 A1 | 4/2004 |
| WO | 2004/077185 A2 | 9/2004 |
| WO | 2004/077185 A3 | 9/2004 |
| WO | 2004/104811 A2 | 12/2004 |
| WO | 2004/104811 A2 | 12/2006 |
| WO | 2006/132693 A1 | 12/2006 |
| WO | 2010/000774 A1 | 1/2010 |
| WO | 2011/039041 A2 | 4/2011 |
| WO | 2011/039041 A3 | 4/2011 |
| WO | 2011/044903 A2 | 4/2011 |

OTHER PUBLICATIONS

Schneider, "Doblo factory" (http://edutechwiki.unige.ch/en/Doblo_factory) cited version of webpage is dated May 11, 2010 as obtained through https://web.archive.org/web/20100511082014/http://edutechwiki.unige.ch/en/Doblo_factory (14 Pg. PDF).*
Schneider, "OpenScad beginners tutorial" https://web.archive.org/web/20100427011023/http://edutechwiki.unige.ch/en/OpenScad_beginners_tutorial#Parametric_Lego_Duplo_block (23 Pg. PDF, as attached in printout form), Apr. 27, 2010.*
International Search Report for corresponding application No. PCT/EP2012/062975, dated Sep. 3, 2012.
USPTO Non-Final Office Action in related U.S. Appl. No. 14/130,418, dated Oct. 23, 2015.
USPTO Final Office Action in related U.S. Appl. No. 14/130,418, dated Jun. 28, 2016.
Notification of Reasons for Refusal in related Japanese Application No. 2014-517466, dated Jun. 20, 2016.
International Search Report for corresponding application No. PCT/DK2012/050250, dated Nov. 14, 2012.
International Preliminary Report on Patentability for corresponding application No. PCT/DK2012/050250, Jun. 18, 2013 (date of completion).
European Patent Office's Communication with Reasons (Form 2906) issued in corresponding EP application No. 12 740 914.2, dated Apr. 7, 2017.
Fleskes, "Reports from: AFOL Days, BrickFest™, LEGO® Fest, LEGO® World, Northwest BrickCon, 1000 Steine®-land, Interviews, Instructions and Much More!", vol. 1, Issue 3, Winter 2005, (116 pages), ), pp. 18-20, Dec. 31, 2005.

* cited by examiner

METHOD AND SYSTEM FOR DESIGNING AND PRODUCING A USER-DEFINED TOY CONSTRUCTION ELEMENT

CROSS-REFERENCE TO RELATED APPLICATIONS

This application is a U.S. National Stage of International Application No. PCT/EP2012/062975, filed on Jul. 4, 2012 and published on Jan. 10, 2013, as WO 2013/004720 A1, which claims the benefit of priority to Danish Patent Application No. PA 2011 70361, filed on Jul. 5, 2011.

FIELD OF THE INVENTION

The invention relates to the design and production of user-defined toy construction element connectable to pre-manufactured toy construction elements of a toy construction system, each pre-manufactured toy construction elements comprising a number of coupling elements for coupling the pre-manufactured toy construction element with one or more other pre-manufactured toy construction elements of said toy construction system.

BACKGROUND OF THE INVENTION

Various types of modelling concepts of physical construction toy sets are known. Especially, concepts using modular or semi-modular concepts are very popular. Typically, these concepts provide a set of pre-manufactured toy construction elements that can be interconnected with each other in some predetermined way. To this end each toy construction element comprises one or more coupling elements for interconnecting the toy construction element with other such toy construction elements. Examples of such systems of toy construction elements include the plastic toy construction elements available under the name LEGO.

While providing a large amount of flexibility, such toy modelling systems are restricted to the pre-manufactured toy construction elements. It would thus be desirable for a user to design and manufacture his or her own, user-defined construction elements that can be interconnected with the pre-manufactured toy construction elements of a toy construction system, thus allowing users of a toy construction system to build an even larger variety of construction models.

Production processes commonly referred to as 3D printing are known. The term 3D printing generally refers to an additive manufacturing technology where a three dimensional object is created by laying down successive layers of material. The 3D printing process generally is based on a 3D computer file or other digital representation of the volume to be filled by material.

Apparatus for performing such a 3D printing process are commonly known as 3D printers. 3D printers are generally faster, more affordable and easier to use than other additive manufacturing technologies. Recently, 3D printers have offered product developers the ability to print parts and assemblies made of several materials with different mechanical and physical properties in a single build process. Advanced 3D printing technologies are used to produce models that can serve as product prototypes. While the 3D printers used in professional product development are advanced and expensive, recently smaller and more affordable 3D printers have been developed that are suitable even for private use.

For the purpose of the present description, the term automated production is intended to include 3D printing and other production technologies that allow an automated production of 3D objects based on a digital, computer-generated representation of an object. It will be appreciated that the term automated production process is intended to refer to production processes that at least in part are performed by an apparatus in an automated manner; however any such process may include one or more manual steps to be performed by a user, e.g. a manual control of the apparatus, a finishing step such as cleaning, polishing, and/or the like.

It is generally desirable to provide a method and system that provides tools for designing and producing a customized item that can be used with the existing parts of the toy construction system to construct customized toy structures.

Users of such toy construction systems may be of any age and level of training. Therefore it is desirable that the method and system does not impose special requirements on training or designer skills of the users.

It is further generally desirable that such a method and system be affordable for a normal user of a toy construction system, that it includes educational, inspirational and/or entertaining elements.

It is further generally desirable that the user-defined construction elements may be used in conjunction with the pre-manufactured construction elements without the need for involved fitting and adjustment efforts by the user.

SUMMARY OF THE INVENTION

Disclosed herein are embodiments of a computer-implemented method of generating a digital representation of a user-defined construction element connectable to one or more pre-manufactured toy construction elements of a toy construction system, each pre-manufactured toy construction element comprising a number of coupling elements for coupling the pre-manufactured toy construction element with one or more other pre-manufactured toy construction elements of said toy construction system, the method comprising determining one or more positions for placement of one or more coupling elements to be included in the user-defined construction element;

receiving input by a user indicative of a user-defined shape;

generating, from at least the user input and the determined one or more positions, a digital representation of a user-defined construction element, the user-defined construction element comprising said one or more coupling elements at said determined one or more positions;

providing the digital representation for automated production of said user-defined construction element.

Hence, a user-friendly, efficient process is provided that ensures compatibility of the resulting user-defined construction element with pre-manufactured construction elements of a toy construction system.

Embodiments of a production process for producing a user-defined construction element based on a generated digital representation may thus comprise selecting coupling types and positions in accordance with the construction system, defining the item shape in digital form resulting in a digital representation of the user-defined construction element, and sending it to a 3D printer or other apparatus for automated production of a 3D object. The thus produced user-defined element may then be incorporated into a model with pre-manufactured items.

The generated digital representation may comprise any suitable data structure suitable for describing a 3D item. It will be appreciated that some embodiments of the process may comprise generating different types of digital representations of the user-defined construction element, e.g. a first representation suitable for displaying of the item on a computer, and for allowing manipulation and editing of the 3D shape by the user by means of a suitable 3D design software. The process may include translating the first digital representation into a second digital representation suitable as an input to an automated production process, e.g. suitable as an input to a 3D printer.

In some embodiments, the digital representation is indicative of a volume to be occupied by a material, e.g. a plastic or other material suitable for the automated production process.

The user-defined construction element may have any size and shape producable by the automated production process where the coupling elements are of a type and are positioned at positions compatible with the toy construction system. In particular, the user-defined constriction element may have a shape different from the shapes of the pre-manufactured toy construction elements of the toy construction system.

The pre-manufactured construction elements may be any toy construction elements having coupling elements that allow them to be interconnected with other pre-manufactured toy construction elements of the toy construction system so as to construct a toy model from the pre-manufactured toy construction elements. The coupling elements may thus be any suitable type of coupling elements allowing interconnection of construction elements, e.g. by frictional forces, a latching function, or using a different coupling principle. The coupling elements may be for releasable interconnection of the toy construction elements so as to allow easy disassembly of a constructed toy model and re-use of the same elements in a different model. When the coupling elements are arranged in a uniform manner according to a set of rules, e.g. located on grid positions of a uniform 3D grid, the toy construction elements may be interconnected in a large variety of different ways. Other rules for arranging coupling elements may include the positioning of coupling elements of different types on different faces of a construction element, thus e.g. defining a bottom face and a top face of a construction element where the bottom face comprises a first type of coupling elements while the top face comprises a second, different type of coupling elements e.g. such that the second type of coupling elements is connectable to the first type. Similarly, the coupling elements may have a coupling direction associated with them, and the coupling elements may be arranged such that the coupling directions of at least a subset of coupling elements of the construction element (e.g. coupling elements on the same face of a multi-faced construction element) are oriented in a uniform direction.

The generation of the shape of the user-defined design process may allow a user to freely design the shape, where the process ensures and/or verifies that the positioning of the coupling elements is in accordance with the rules for arranging coupling elements in the toy construction system. Additionally, the process may ensure and/or verify that additional design constraints are observed. For example, the automated production process may impose a number of design constraints, e.g. as to the size of the item that may be produced, minimal and/or maximum wall thickness, a minimum or maximum radius of curvature of edges, and/or the like. Similarly, the toy construction system may also impose additional design constraints. In particular, each type of coupling element may have one or more associated design constraint so as to ensure that the coupling element can actually be coupled to another coupling element.

At least a first design constraint associated with each coupling element may comprise defining a first volume associated with each coupling element; and enforcing the first design constraint may comprise generating the digital representation to be indicative of an element volume comprising the first volume. Hence, the process ensures that the user does not remove any necessary part of a coupling element.

Similarly, at least a second design constraint may comprise defining a second volume associated with the coupling element; and enforcing the second design constraint may comprise generating the digital representation to be indicative of an element volume excluding the second volume. Hence, the user is efficiently prevented from filling or blocking any empty space required for the coupling element to be connected with another coupling element.

Generally, enforcing a design constraint may comprise generating a digital representation of a user-defined construction element, the user-defined construction element having a modified shape determined from the input by the user and from the design constraints and comprising said one or more coupling elements at said determined one or more positions.

In some embodiments, the process may enforce additional or alternative design constraints. For example, one design constraint may impose a minimum number of coupling elements to be included in the construction element. Another example of a design constraint may impose a minimum distance between coupling elements, where the minimum distance may be a function of the respective types of coupling elements. Other design constraints may impose alternative or additional constraints regarding e.g. the number of coupling elements or their relative placement. Some design constraints may e.g. based on an estimated weight of the designed element, or a calculation of torques given the previously placed coupling elements. In yet another example, a design constraint may enforce constraints on which surfaces certain types of coupling elements may be placed. For example, in an embodiment comprising coupling elements in the form of protrusions and corresponding cavities (e.g. as described in connection with FIGS. 3a-c above), coupling elements of the protrusion type and the cavity type may be restricted to be placed on opposing surfaces of a construction element, thus defining a top (i.e. upwardly directed) surface and a bottom surface (i.e. downwardly directed). For example, protrusions may be limited to be placed on a top surface while cavities may be limited to be placed on bottom surfaces.

Apart from the enforcement and/or verification of such design constraints, the degree of freedom a user may be given by the computer-implemented process may differ in different embodiments, e.g. based on the level of skill, experience, and/or age of the target users. While some embodiments may allow for a large degree of freedom, others may limit the degrees of freedom in various ways, e.g. by restricting the user input to selecting shapes from a set of template design elements that may be combinable in a number of predetermined ways.

In particular, in some embodiments, the computer-implemented process provides a set of user-selectable basic shapes and easy and intuitive tools to get a quick start on the design process. The computer-implemented design process may be supported by guidelines and automated checks for adhering to the formal requirements and rules employed by the construction system. The creative part of the design process may be supported by means of inspiration with templates and ideas from professional designers.

It will be appreciated that the determination of the positions and types of coupling elements may be performed prior to receiving the user-input indicative of a user defined shape. For example, the process may initially determine, e.g. at least partly based on a user-input, the positions and optionally the types and/or orientations of the coupling elements relative to a suitable coordinate system. Subsequently the user may use a suitable design tool to design the shape of the construction element with the selected placement of coupling elements. Alternatively or additionally, the user may initially design a shape and subsequently the process may determine positions, e.g. at least partly based on a user-input, the positions and optionally the types and/or orientations of the coupling elements relative to the designed shape. It will further be understood that the positioning of coupling elements may be performed during the design of the user defined shape, e.g. as an integrated part of the design step. For example, the user may be given the opportunity to change a previously selected position of coupling elements.

The present invention may be implemented in different ways including the method described above and in the following, a data processing system, and further product means, each yielding one or more of the benefits and advantages described in connection with at least one of the above-mentioned aspects, and each having one or more preferred embodiments corresponding to the preferred embodiments described in connection with at least one of the above-mentioned aspects and/or defined in the dependent claims.

It is noted that the features of the method described above and in the following may be implemented in software and carried out in a data processing system or other processing means caused by the execution of computer-executable instructions. The instructions may be program code means loaded in a memory, such as a RAM, from a storage medium or from another computer via a computer network. Alternatively, the described features may be implemented by hard-wired circuitry instead of software or in combination with software.

Further disclosed herein is a computer program comprising program code means for performing all the steps of the method described above and in the following when said program is run on a computer. The computer program may be embodied as a computer-readable storage medium, as a data signal embodied as a carrier wave, or the like.

Further disclosed herein is a computer program product comprising program code means stored on a computer readable medium for performing the method described above and in the following when said computer program is run on a computer.

Generally, the user-defined construction element may be rigged, designed and prepared digitally by special software supporting all the phases of the process. Such software may serve multiple purposes, and embodiments of such a computer program may provide functionality for:

allowing the user to specify the type(s) and placement(s) of the coupling element(s) on the user-defined construction element;

allowing the user to freely design the shape of the user-defined construction element, and assisting the user in the process;

visualizing the designed construction element interactively during the process;

explaining and/or enforcing relevant rules of the construction system;

incorporate some sort of driver or other interface for interoperating directly with a 3D printer system.

Further disclosed herein are embodiments of a data processing system configured to perform the steps of the method disclosed herein. The data processing system may comprise a 3D printer or other suitable apparatus for automated production of a toy construction element based on the generated digital representation.

Hence, embodiments of the method and system disclosed herein allow the user to test and adjust a design immediately, in rapid iteration cycles; Effectively, the production of the physical item is an integrated part of the process.

Furthermore, embodiments of the method and system described herein provide an affordable production of user-defined construction elements where the cost for producing an item is reasonable compared to the price of the pre-manufactured items and to models the item will be used in conjunction with. Furthermore, the cost may be kept reasonably low so as to allow multiple iterations for experiments and adjustments of a design in order not to restrain the creative design process.

Generally, embodiments of the method disclosed herein provide a process that ensures that the resulting user-defined construction elements fit other construction elements from the toy construction system with respect to their physical features, in particular the shape, dimension and orientation of couplings. For example, embodiments of the process ensure relative placement of couplings in accordance with any modular grid etc. defined by the construction system. Furthermore, other rules employed by the construction system, e.g. conventions on the orientation of specific types of couplings, may be verified and ensured by embodiments of the process disclosed herein.

BRIEF DESCRIPTION OF THE DRAWING

Embodiments of the invention will be explained more fully below in connection with a preferred embodiment and with reference to the drawing, in which.

DETAILED DESCRIPTION OF PREFERRED EMBODIMENTS

Figure 1A:
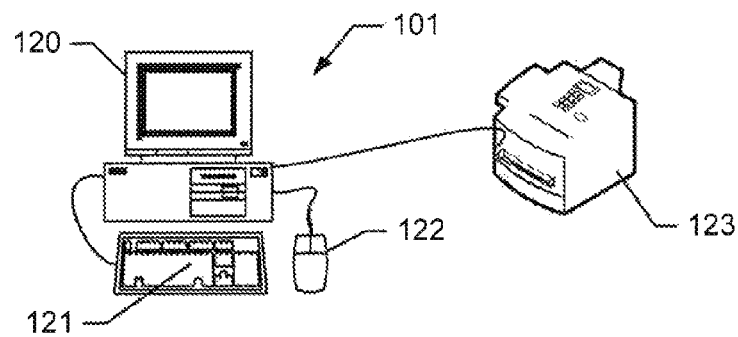
FIGS. 1a-b show a data processing system for generating and manipulating a digital representation of a user-defined construction element.
Figure 1B:
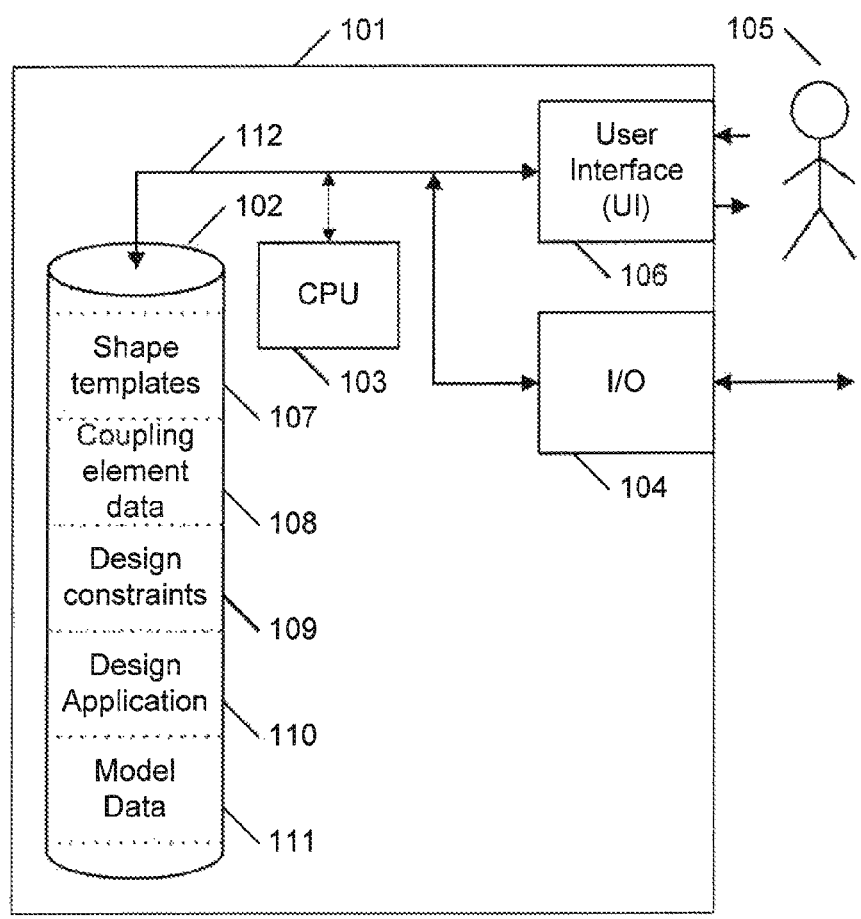

FIGS. 1a-b show a data processing system for generating and manipulating computer-readable models of geometrical objects.

FIG. 1a shows a schematic view of an example of a computer system. The computer system comprises a suitably programmed computer 101, e.g. a personal computer, comprising a display 120, a keyboard 121 and a computer mouse 122 and/or another pointing device, such as a touch pad, a track ball, a light pen, a touch screen, or the like.

The computer system designated 101 is adapted to facilitate designing, storing, manipulating, and outputting digital representations of user-defined toy construction elements. The computer system 101 can be used as a stand-alone system or as a client in a client/server system.

The system further comprises a 3D printer 123 or another suitable apparatus for automated production of a 3D object connected to the computer 101. It will be appreciated that the 3D printer may also be positioned at a remote location, e.g. connected to another computer, and the digital representation (or control codes derived therefrom) may be communicated to the 3D printer via a suitable computer network or other communications means.

FIG. 1b shows a block diagram of a data processing system for generating and manipulating digital representations of user-defined toy construction models. The computer 101 comprises memory 102 which may partly be implemented as a volatile and partly as a non-volatile memory means, e.g. a random access memory (RAM) and a hard-disc. The memory has stored thereon computer program code implementing a 3D design application 110 for generating digital representations of construction elements as described herein when executed by the central processing unit 103. Further, the memory has stored therein Model Data 111, i.e. a set of data structures representing a digital representation of a physical object, e.g. a user-defined toy construction element. Examples of a data format for storing user-defined toy construction elements include but are not limited to any suitable file format for storing 3D shapes, e.g. as meshes, such as WaveFront OBJ.

Further examples include data formats representing the 3D shape as a volume, such as a voxel-based data format (e.g. RAW, DAT, OpenQVis, Fields 3D). Furthermore, the digital representation of the toy construction set may be stored in a data format for storing a tree representation of a Constructive Solid Geometry (CSG); this allows storing of an entire design process. For example, such a tree format may be implemented as an XML format representing a tree structure and includes pointers or other references to respective data files or objects (e.g. represented in Wavefront OBJ format) having stored representation of the basic shapes on which the CSG tree structure is based.

Further, the memory has stored therein data describing design templates (107), coupling elements (108) and design constraints (109).

The design application 110 may comprise functionality for reading and interpreting data structures defining a physical shape, e.g. a user-defined toy construction element. The design application may be operable to read a data structure and to convert such a data structure into a known graphic format for presentation on a computer display.

The design application further comprises functionality for converting a user's interaction with a user interface into user commands e.g. for retrieving a template shape from a library of elements, for placing a selected shape at a user-selected position in a modelling environment, for manipulating a digital representation of a user-defined toy construction element, e.g. by initiating a rotation, modifying the shape of the user-defined construction element, etc. Along with each command, there may be associated a set of respective parameters, e.g. cursor coordinates with respect to the display coordinate system, types of shapes, etc. The design application is operable to modify the data structures of a physical shape in response to a user's commands. The design application is further adapted to control memory, files, the user interface, etc.

A user 105 is capable of interacting with the computer system 101 by means of the user interface 106, preferably comprising a graphical user-interface displayed on a computer screen, and one or more input devices such as a keyboard and/or a pointing device.

In order to load, save, or communicate digital representations of user-defined toy construction elements, or other data, the computer system comprises an input/output unit (I/O) 104, optionally providing multiple I/O ports, e.g. a serial port, a parallel port, a network interface, a wireless interface, and/or the like. The input/output unit can be used as an interface to different types of storage media and different types of computer networks, e.g. the Internet. Further, the input/output unit (I/O) 104 can be used for exchanging data structures with other users e.g. interactively. Furthermore, the input/output unit may be configured to communicate data to an apparatus for automated production of a 3D object, e.g. to a 3D printer. To this end the memory may have stored therein a device driver or similar software operable to convert a digital representation generated by the design application into suitable control codes interpretable by the automated production of a 3D object.

Data exchange between the memory 102, the central processing unit (CPU) 103, the user interface (UI) 106, and the input/output unit 104 may be accomplished by means of the data bus 112.

Figure 2:
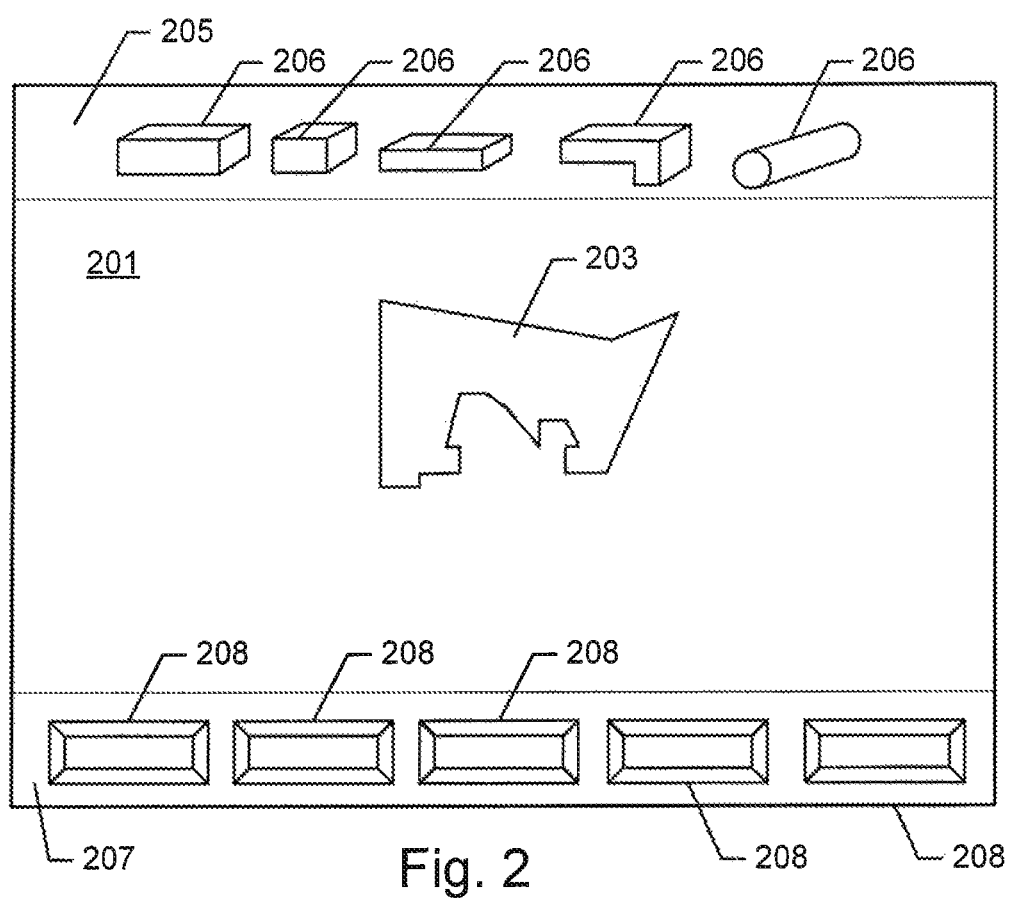
FIG. 2 shows a graphical user-interface of a data processing system for generating and manipulating a digital representation of a user-defined construction element.

FIG. 2 shows a graphical user-interface of a design application. The user-interface comprises a display area 201 showing a view of a 3D shape 203 representing a user-defined toy construction element. The shape is shown from a predetermined viewpoint. The user-interface further comprises a palette panel 205 comprising a number of basic shapes 206 that may be selected by the user. For example, a user may click on one of the basic shapes 206 with the mouse, thereby selecting that shape, and drag the selected shape into the display area 201 to a desired position. Additionally, the user interface may comprise one or more further palette panels, allowing the user to select e.g. examples of coupling elements.

The user-interface further comprises a menu bar 207 comprising a number of menu buttons 208 for activating various functions or tools. For example, the tool bar may comprise a rotation tool for changing the virtual camera position, thereby allowing the user to view the shape 203 from different directions. The menu bar may further comprise a zoom tool for zooming in and out to/from the 3D shape. Other examples of tools include a drawing tool for drawing an outline of a physical shape, a combination operator tool for combining different shapes, an eraser tool for erasing user-selected portions of a shape, etc.

The menu bar 207 may further provide standard functions, such as functions for saving a data structure, opening a previously saved data structure, printing an image of a user-defined construction element, a help function, selecting a 3D printer, initiating a 3D print process etc.

Figure 3A:
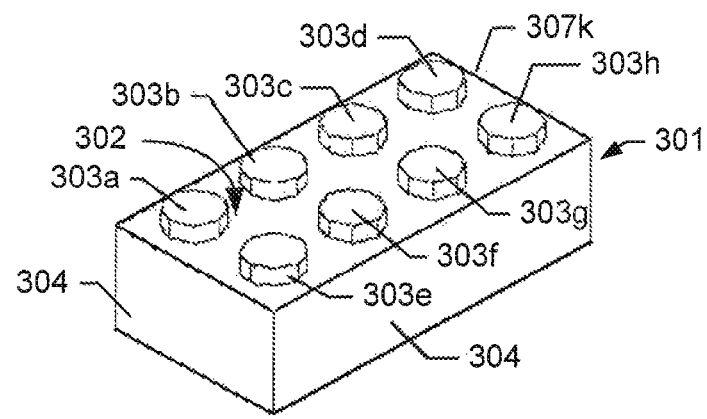
FIGS. 3a-c illustrate examples of pre-manufactured toy construction elements and their coupling elements.
Figure 3B:
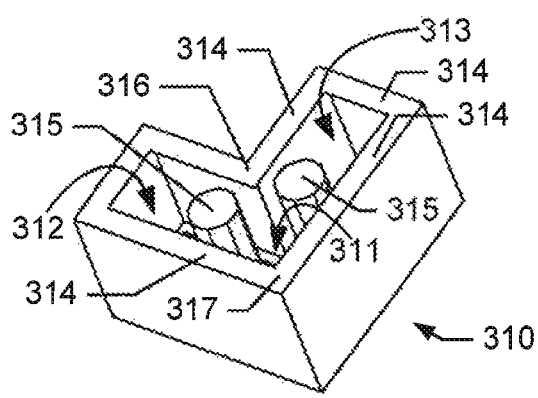
Figure 3C:
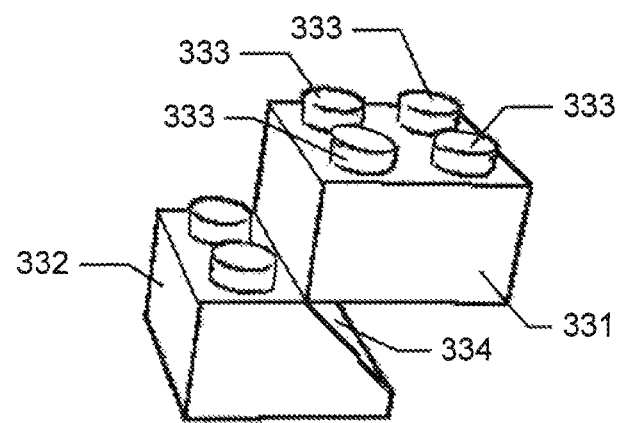

FIGS. 3a-c illustrate examples of construction elements and their coupling elements.

FIG. 3a shows a perspective view of a construction element 301. The construction element 301 has a top surface 302 with eight knobs 303a-h that can engage with corresponding holes of another construction element, e.g. holes on the bottom surface of another construction element. Correspondingly, construction element 301 comprises a bottom surface (not shown) with corresponding holes. The construction element 301 further comprises side faces 304 that do not comprise any coupling elements.

Generally, the coupling elements may be grouped into different classes of coupling elements, e.g. connectors, receptors, and mixed elements. Connectors are coupling elements which may be received by a receptor of another construction element, thereby providing a connection between the construction elements. For example, a connector may fit between parts of another element, into a hole, or the like. Receptors are coupling elements which can receive a connector of another construction element. Mixed elements are parts that can function both as a receptor and a connector, typically depending on the type of the cooperating coupling element of the other construction element.

FIG. 3b shows a perspective view of a construction element 310 seen from below. The construction element 310 has a non-rectangular top and bottom face. The bottom face comprises holes 311, 312, and 313 for receiving corresponding knobs of one or more other construction elements, e.g. the construction element 301 of FIG. 3a. The holes are defined by the edges 314, by secondary pins 315, as well as the corners 316 and 317. Hence, the properties of all of the above elements determine the connectivity properties of the bottom face of the construction element 310.

FIG. 3c shows two construction elements 331 and 332. Construction element 331 is a brick having four knobs 333 on its top face and four corresponding holes on the bottom face (not shown). Brick 332 is an example of a construction element with a surface that comprises planes which are not mutually orthogonal. Specifically, construction element 332 has a slanted face 334. As is illustrated in FIG. 3c, in their current positions, the construction elements 331 and 332 do not connect, since there are no coupling elements that, in the shown position, engage with each other.

It is understood that the above construction elements and their coupling elements merely serve as examples of possible construction elements and of possible coupling elements.

Figure 4:
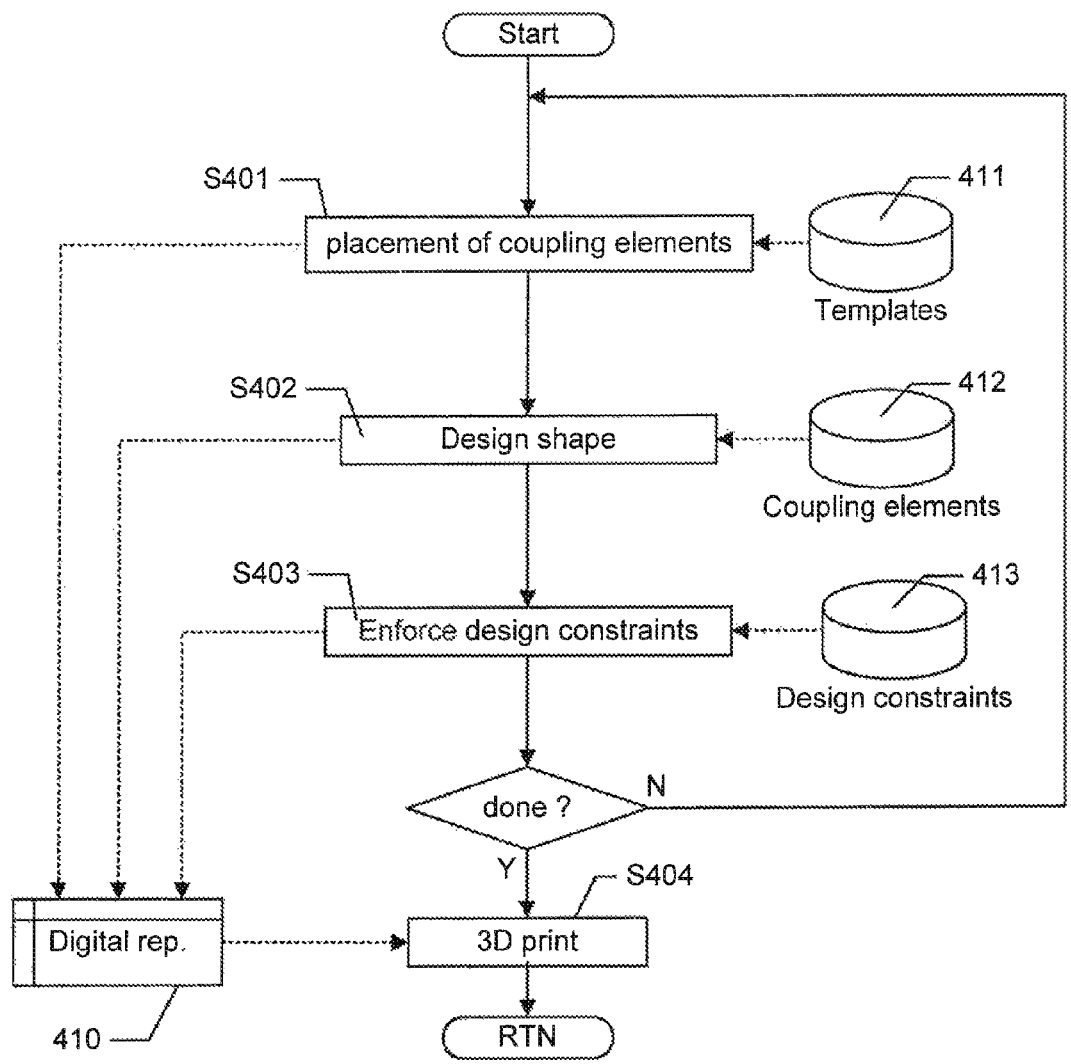
FIG. 4 shows a flow diagram of a process of generating a digital representation of a user-defined construction element.

FIG. 4 shows a flow diagram of a process for producing a user-defined construction element. The process includes an initial sub-process of generating a digital representation of the user-defined construction element followed by a step S404 of producing the user-defined construction element based on the generated digital representation.

The sub-process of generating the digital representation may be implemented in software executed on a data processing system, e.g. a suitably programmed general purpose computer.

The sub-process of generating the digital representation comprises an initial step S401 of selecting one or more coupling elements from a set of available types of coupling elements, and selecting a position and orientation for each of the selected coupling elements, e.g. relative to a suitable coordinate system. For example, the process may define a discrete 3D grid relative to the coordinate system. Some or all of the grid points of the grid may represent valid positions for coupling elements. For example, the 3D grid may have the form of parallel planes, each plane comprising a 2D grid each a rectangular or square grid. The 2D grids of the individual planes may be aligned with each other. It will be appreciated that the selection of the coupling elements, their positions and/or their orientations may at least partly be based on respective user-selections. For example, the user may be provided with functionality for selecting a type of coupling element. To this end, the data processing system may comprise a database 411 or another suitable repository of digital representations of respective coupling elements.

The database 411 or other repository may be stored in a memory or other suitable storage device of the data processing system. Similarly, the user may be provided with functionality for selecting a position for placement of the selected coupling element. The process may automatically restrict the selectable positions to the grid points of the 3D grid. Similarly, the user may be provided with functionality for selecting an orientation of the selected coupling elements. The process may automatically restrict the orientations, e.g. to discrete directions relative to the coordinate system. A graphical representation of the selected coupling elements may be displayed at the selected positions in the display area of a user-interface of the data processing system. A digital representation 410 of the coupling elements, their positions and orientations may be generated and stored in a memory or other storage medium of the data processing system.

Generally, in some embodiments the process may provide functionality for allowing the user to initially specify the couplings that will connect the user-defined construction element to one or several pre-manufactured construction element. This may happen in a number of ways.

In some embodiments, the user may select one or several instances from a bank, maintained by the data processing system, of coupling elements that are known to work well in general with 3D prints or specifically with the particular 3D printing system at hand. The system may then assist the user in placing these couplings according to whatever type of grid and rules the construction system imposes. For example, for the modular construction system sold under the name LEGO, the placement of couplings will follow one grid horizontally and another vertically, and certain coupling elements may be restricted to specific orientations, e.g. knobs always facing upwards etc. Alternatively or additionally, the user may select a coupling element from a bank of coupling elements to which the user-defined construction element is to be attachable. The process may then automatically select a suitable type of mating coupling element and allow the user to place the mating coupling element.

Alternatively or additionally, the data processing system may provide functionality allowing a user to import a digital representation of a toy model constructed from construction elements of the toy construction system. The digital representation of a toy model may be generated using any suitable method known as such, e.g. the method disclosed in WO2004/034333. A commercially available example of a suitable digital modelling tool is available under the name LEGO Digital Designer. In particular, such a digital model may comprise a representation of the positions and types of coupling elements of the construction elements from which the imported model is constructed. The imported model may then represent a base to which the new user-defined construction element should be attachable. Accordingly, the process may identify the exposed coupling elements of the imported digital model to which coupling elements available for the user-defined construction element are attachable. The process may then provide functionality allowing the user to select one or more of the identified exposed coupling elements to which the user-defined construction element should be attachable. The process may then determine the types, positions and orientations of coupling elements that are to be connectable to the user-identified coupling elements of the imported digital model.

An example could be a model train for which the user wants to create a new, aerodynamic front; the user can build the entire locomotive in LEGO Digital Designer and leave the room and knobs for attaching the new front open.

Effectively, with LEGO Digital Designer already ensuring model compatibility with the rules of the construction system, the chosen set of couplings will already be aligned and oriented properly with respect to the relevant grids and rules.

In step S402 the process provides the user with functionality allowing the user to design the shape of the construction element. For example, the user may be provided with functionality for selecting a template of a construction element. To this end, the data processing system may comprise a database 412 or another suitable repository of digital representations of respective design templates of construction elements and/or of parts of construction elements. The database 412 or other repository may be stored in a memory or other suitable storage device of the data processing system.

The process may display a graphical representation of the selected template and the selected coupling elements in the display area of a graphical user-interface of the data processing system. The process may further provide functionality allowing the user to modify the shape, e.g. various drawing and design tools known as such in the art. Alternatively or additionally the user may be provided with functionality for designing a new shape without initially selecting a template.

Generally, upon selection of the placement of the coupling elements, the user may be given a high degree of freedom to easily design the actual shape of the new construction element in a way so that it intersects the coupling elements and such that they form a single, connected, solid geometry ready for printing. For example, the process may generate a voxel structure representing the user-defined shape. Based on the voxel structure, the process may then determine (e.g. by a colouring algorithm) that the shape has a single, connected geometry. Furthermore, the process may use a thinning process or a similar morphological operation to identify thin/fragile parts of the geometry. The design may be a free form process using a techniques known as such in the art, e.g. techniques known as such from Computer Aided Design (CAD) systems and/or modelling programs. In some embodiments, the process may provide a bank of predefined shapes including basic shape primitives (boxes, spheres, tori, cylinders etc.) as well as more detailed, decorative and pre-designed templates. The user must be able to modify such items by placing, rotating, scaling and possibly altering the shape in other ways; the process may provide functionality for providing a free-hand sculpting mode, where the user easily by hand (mouse) can nudge, smoothen, expand, contract, and/or otherwise manipulate specific parts of a shape surface much like working directly on e.g. a plaster model. Furthermore, the process may allow importing shapes from arbitrary 3D models, e.g. downloaded from the internet.

The process may further provide functionality allowing a user to combine shapes into more complicated ones; in this way even an untrained user can quickly build the desired construction element by combining basic and predefined shape and without the need or skills for constructing the individual shapes. An example of providing easy-to-use functionality allowing a user to combine multiple sub-shapes to a shape of a construction element will be described in more detail below.

The process may store a modified digital representation 410 of the shape modified and/or designed by the user including the selected coupling elements in a memory or other suitable storage device of the data processing system.

It will be appreciated that even though steps S401 and S402 are shown as separate steps in FIG. 4 they may be combined into a single step or performed in a different order. For example, a process may allow a user to edit a user-defined shape both before and after selecting and positioning coupling elements.

During step S403, the process verifies whether a number of pre-defined design constraints are fulfilled. To this end, the data processing system may comprise a database 413 or another suitable repository of design constraints. The database 413 or other repository may be stored in a memory or other suitable storage device of the data processing system. If the process determines that one or more design constraints are not fulfilled, the process may inform the user of the relevant design constraints and optionally provide guidelines as to how fulfil the relevant design constraint. Alternatively or additionally, the process may automatically modify the user-designed shape so as to enforce fulfilment of the design constraint. Changes resulting from user-modifications responsive to being alerted about unfulfilled design constraints and/or from automatic enforcement of the design constraints result in a modification of the digital representation 410. Furthermore, the process may display a graphical representation of the modified shape, optionally with the performed changes suitably highlighted.

The process may provide functionality for maintaining the shape designed by the user, optionally including the option to go backwards and adjust or undo parts of the design process, as well as handling the more formal requirements on the chosen couplings, which are ultimately also part of the designed shape. Examples of design constraints associated with coupling elements will now be described in more detail.

In some embodiments, the process may enforce a set of design constraints by generating a hierarchical combination of geometric shapes, representing user-defined and/or user-selected shapes and shapes associated with respective coupling elements, e.g. using ordinary set operators of union, intersection and/or difference, so as to define the relationship between a shape and the sub-shapes it is made up from. To this end, process may employ a technique known as Constructive Solid Geometry (CSG). Generally, CSG allows the user to 'add' two shapes together or to 'subtract' one shape from another (using union and difference set operators and/or the intersection operator).

In the following, and with reference to examples shown in FIGS. 5 and 6, the enforcement of design constraints associated with coupling elements will now be illustrated. It is worth noting that FIGS. 5 and 6 show geometric shapes in the form of two-dimensional cross sections. However, it will be appreciated that the discussed principles apply to 3D models as well. Furthermore, FIGS. 5 and 6 show specific examples of coupling elements and user-defined shapes. However, it will be appreciated that the process of enforcing design constraints by defining set relationships between shapes and sub-shapes may be applied to other types of coupling elements and/or user-defined shapes as well.

Figure 5A:
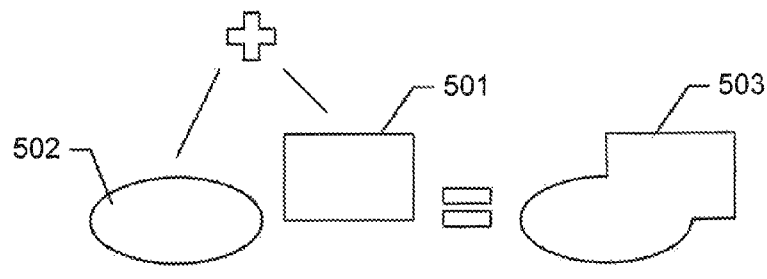
FIGS. 5a-c and 6a-b illustrate a hierarchical data structure for digitally representing a construction element and facilitating enforcement of design constraints.

In the example illustrated in FIG. 5a, the user has chosen to add a basic rectangle 501 to an ellipse 502 resulting in a more complex, solid shape 503 with both curved and straight edges. In 3D the rectangle may correspond to a box, the ellipse to an ellipsoid and the edges correspond to surfaces in 3D.

The process may maintain a hierarchical structure, e.g. in the form of a CSG tree, defining the original basic shapes (and their placement, scaling etc.), and a chosen operator that combines them, in the example of FIG. 5a the union operator.

Generally, embodiments of the process for generating a digital representation of a user-defined construction element may thus generate the digital representation of the user-defined construction element as a hierarchical data structure, e.g. as a binary tree, where the leaf nodes of the tree represent basic geometric shapes, and where each node represents a set operation on its immediate predecessor nodes. The root node thus represents the final construction element. It will further be appreciated that the nodes may have additional attributes associated with them. For example, the leaf nodes representing basic shapes may have coordinates associated with them indicative of the position and rotation of the shape.

Figure 5B:
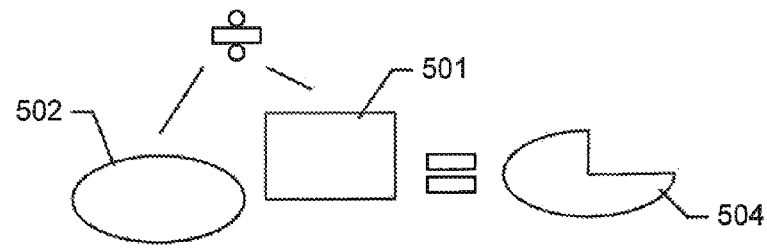

In the example illustrated in FIG. 5b, the user has instead chosen to subtract/cut away a rectangle (box) 501 from an ellipse (ellipsoid) 502 resulting in a different, more complex, solid shape 504.

Hence, set operators such as union and difference provide an easy-to-use mechanism for the user to create e.g. round or rectangular holes in or through objects, or to level the bottom surface of a rough shape.

Again, internally the process may simply maintain a small hierarchical data structure, e.g. a CSG tree, for the new combined shape 503 or 504, whereas the process may display the direct, geometric result on screen.

Figure 5C:
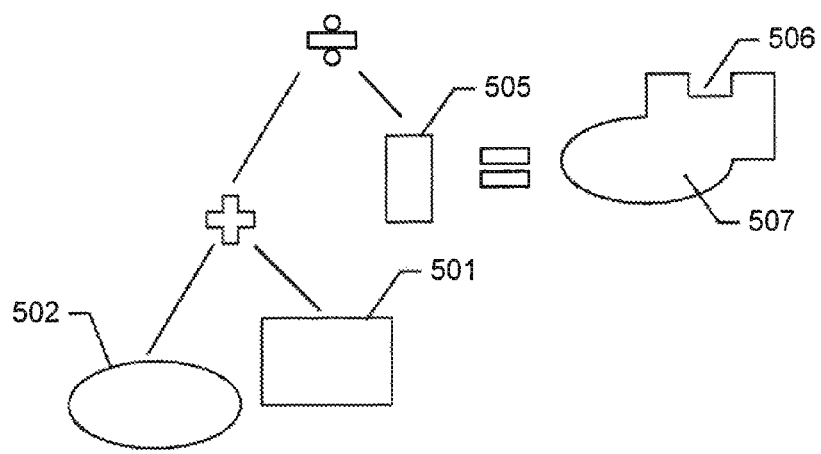

It is an advantage of hierarchical data structures and set operators such as CSG that they provide the ability to further combine shapes which themselves are made up of smaller hierarchical structures, thus creating large, hierarchical structures resulting in very complex shapes just by interactively adding and subtracting them. For example, FIG. 5c illustrates an example where the user has chosen to subtract a smaller cylinder 505 from the initial shape 503 created by adding an ellipsoid 501 and a box 502, thereby creating a small cavity 506 in the upper surface of the resulting shape 507. Note that by maintaining the entire hierarchical structure including the operations combining them as an internal representation it is easy later to go backwards and undo shape combinations or e.g. adjust the position of the initial sphere and just recalculate the final, resulting shape.

In the context of embodiments of the design process for generating digital representations of user-defined construction elements described herein, hierarchical structures such as CSG trees may be used to ensure the order of combinations of shapes and thereby effectively enforcing the integrity of the initially placed couplings, no matter how the user defines the overall shape of the designed construction element.

Generally, each coupling element may be associated with one or more first volumes, i.e. a region in 3D space, that is to be filled material as well as one or more second volumes that should remain empty.

Figure 6A:
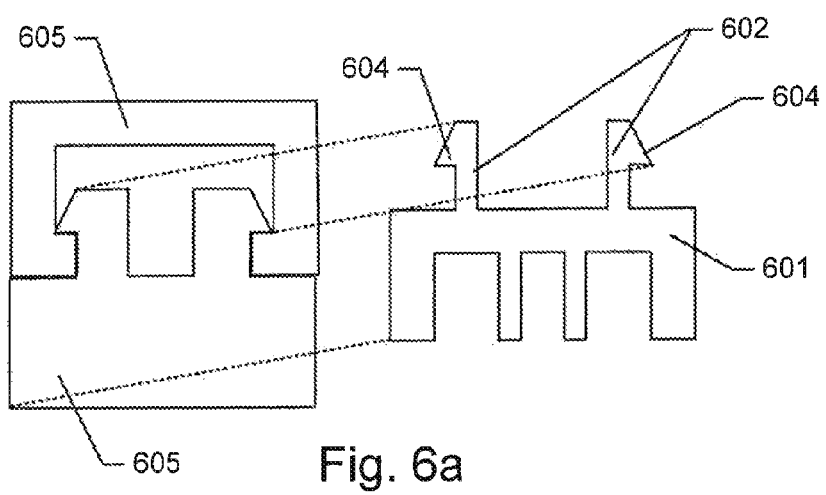

For example, FIG. 6a illustrates an example of a pre-manufactured construction element 601 comprising a coupling element 602 in the form of a pair of protruding arms each having a hook-like lateral protrusion 604. A mating coupling element in a user-defined construction element that is attachable to the coupling element 602 may e.g. have the form of a cylindrical blind hole or other shape providing a pair of opposing surfaces with respecting flanges protruding towards the corresponding other surface. The user-defined construction element should thus both comprise a suitable structure to which the coupling element 602 can connect and provide sufficient space where the coupling element 602 from the pre-manufactured construction element can be inserted as well as the room the elements of the coupling element 602 may need to flex.

To this end, a coupling element of the user-defined construction element may be defined by a first volume 605 that is to be filled by material allowing the coupling element 602 to grip onto the user-defined construction element, and a second volume 606 that should remain empty allowing the coupling element 602 to slide in place, including the room to flex the connector arms. It will be appreciated that two types of volumes, i.e. one or more volumes that have to be filled with material, and one or more volumes that have to remain empty, may also be defined for other types of coupling elements.

The process may then enforce design constraints associated with coupling elements by defining the above two types of volumes for each type of construction elements. A coupling element to be included in the user-defined construction element may thus involve including the two types of volumes as leaf nodes in the hierarchical data structure representing the user-defined construction element. The process may further generate a successor node combining the volumes associated with coupling elements with the remaining shapes. In particular, the first volume may be combined by means of a union operation, while the second volume may be combined by means of a difference operation.

In particular, the volumes associated with the construction elements may be placed proximal to the root of the tree structure while all shapes designed by the user are placed in a subtree subordinate to the volumes associated with the coupling elements, thereby ensuring that no solid volume added by the user fills any of the cavities required by the coupling elements. Similarly, the process may ensure that the user does not cut away any part of the coupling element that is required for the proper coupling function.

Figure 6B:
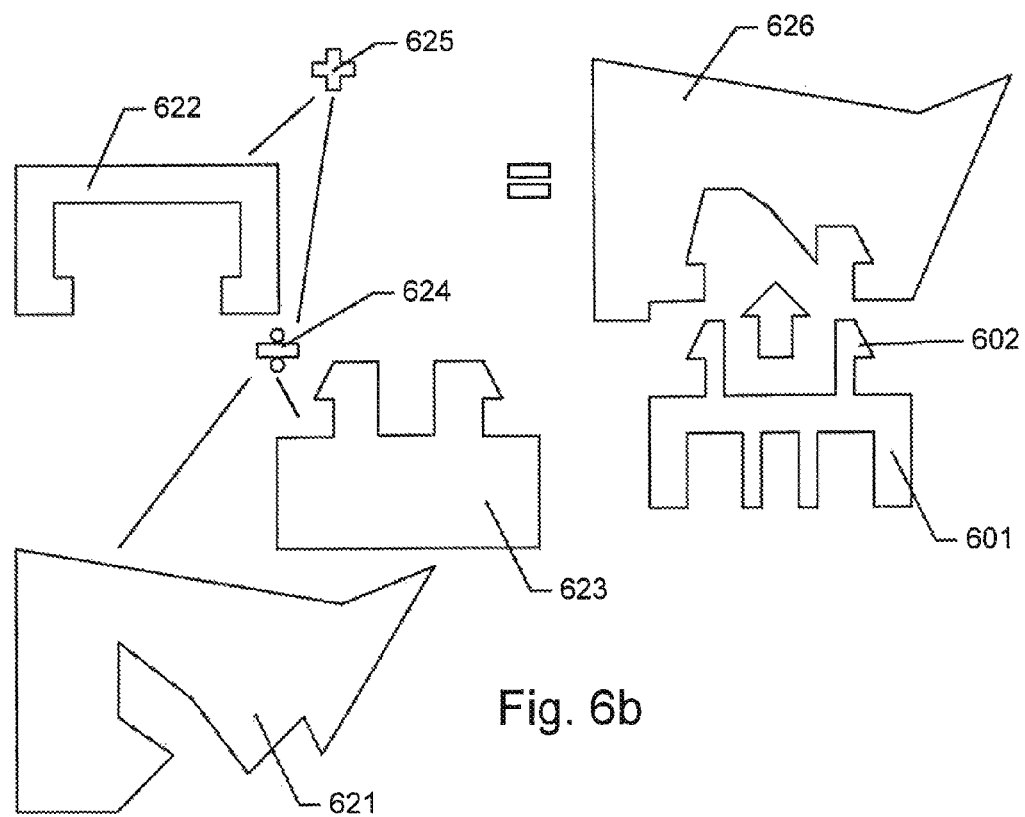

FIG. 6b schematically illustrates an example of digital representation in the form of a tree structure. The tree structure comprises leaves 621, 622, 623, where leaf 621 represents a user-defined shape, while leaves 622 and 623 represent volumes associated with a coupling element attachable to the coupling element 602 of a pre-manufactured construction element 601. Leaf 622 represents a first volume that needs to be solid, i.e. filed by material, whereas leaf 623 represents a second volume that needs to remain empty. Even though node 621 is shown as a leaf node, it will be appreciated that node 621 may be the root of a sub-tree comprising multiple nodes representing combinations of respective partial shapes together forming the user defined shape 621.

When volume 623 is subtracted from volume 621 (as represented by node 624) and volume 622 is added to the resulting difference volume by a union operation (as represented by root node 625), the resulting shape has the form illustrated by volume 626, ensuring that the resulting construction element can be connected to coupling element 602. In particular, since shape 621 designed by the user is subordinate to the volumes 622 and 623 defining the couplings, shape 623 always carves out the necessary space for the coupling element to be able to slide into place, and shape 622 always adds material where needed to provide the edges that the coupling element 602 can hinge on.

Hence, in a tree structure such as a CSG tree, when the volumes associated with coupling element are applied at root level, coupling integrity of the resulting shape of the user-defined construction element may be ensured It will further be appreciated that the process may include an associated volume that represents an imported base model to ensure that no part of the designed item will collide with the model for which it was designed. Furthermore, the process may calculate the necessary extra free space needed for the item to slide in place on the selected couplings, effectively safe-guarding the user from making a design that fits in theory but cannot be attached in the real world.

Again referring to FIG. 4, it will be appreciated that even though step S403 is shown as separate step in FIG. 4, the verification and/or enforcement of design constraints may partly or completely be integrated into one or both of steps S401 and S402, e.g. as described in connection with the enforcement of valid positioning of the coupling elements relative to a grid above.

When the design process is completed, e.g. by responsive to a user-command, the process may forward the resulting digital representation 410 to a 3D printer or another suitable peripheral device for automated production of the construction element; otherwise the process may return to step S401 allowing the user to continue the design process. When the user has finished the design process and is ready for producing the designed construction element, the exact shape of the construction element is represented in the software as a solid geometry specification, e.g. based on the hierarchical data structure described above. It will be appreciated that the process may save the digital representation in non-volatile memory, on a hard disk or another suitable storage medium.

Before sending the model off to the 3D printer system, the software may perform various checks and adaptations to the model, some of which may be required depending on the actual 3D printing technology employed.

Many 3D printers produce items layer by layer either bottom to top or top to bottom. In both cases over- (or under-)hanging details, i.e. details that are not connected to the rest of the item until the 3D printing process reaches the layer that connects them, may require adaptations of the item to be printed. To prevent such a (temporarily) segmented and disjoint structure it may be necessary to add temporary support structures to the model before sending it to the printer—typically tiny columns of material that will support the disconnected parts of the structure until the printing has finished. The user will then by hand remove these support structures and clean up the item, e.g. by cutting or sanding down the stubs remaining from the columns.

Furthermore, it may be necessary to add support structures to minimize the gravitational force on various details during the printing process. The software process may make these physical calculations on the item before printing it, and the process may automatically or in cooperation with the user, specify where and how support structures should be included.

The software will also be able to perform other checks on the integrity of the designed item before producing it, typically by applying mathematic morphology to the geometric structure. Such checks could include checks (and warnings) for disjoint segments and parts too thin to produce or last.

Also, mathematic morphology can be applied to introduce cavities inside very large, solid volumes—or to make the entire solid structure into a shell representation without altering any part of the surface—in order to reduce material usage, energy usage, production time and/or price or to reduce weight and strain on the produced item. Again, the needs and methods may vary depending on the 3D printing technology at hand.

Furthermore, the process may forward the digital representation unchanged or after translation into a different format. The software process may further interact directly with the 3D printer (and its accompanying lower level driver software) including any required interaction with the user (dialogs supporting the manual setup process that may be required by the user). This may be advantageous as an untrained user may not be able to export the solid model to a file, possibly convert it to another 3D file format that suits the particular printer and finally print it using some third-party software. To support untrained users and to allow a design cycle with rapid iterations, the entire production process must be an integral part of the software.

Finally, in step S404, the user-defined construction element is produced by the 3D printer or other peripheral device.

It is understood, that a skilled person may, within the scope of the invention, implement variations of the above method. For example, the order of some of the above steps may be changed, steps may be combined, etc.

What is claimed is:

1. A computer-implemented method of designing and manufacturing a user-defined toy construction element that is connectable to one or more pre-manufactured toy construction elements of a toy construction system, wherein each pre-manufactured toy construction element comprising a number of coupling elements to provide interconnected coupling of the pre-manufactured toy construction element with one or more other toy construction elements of said toy construction system, the method comprising:

receiving, from a user to a software design application, input indicative of a user-defined 3D shape of the user-defined toy construction element, and receiving input indicative of one or more positions for placement of one or more coupling elements to be included in the user-defined toy construction element, the positions being relative to a coordinate system grid; automatically restricting the positions of the received input indicative of positions of the one or more coupling elements by restricting the positions to specific selectable position grid points of the coordinate system grid;

generating, from at least the user input of the 3D shape and the input of the one or more positions of the one or more coupling elements, a digital representation of a user-defined toy construction element, the user-defined toy construction element comprising said one or more coupling elements at said one or more positions;

automatically implementing one or more automated design constraints on the user-defined 3D shape associated with the digital representation of the user-defined toy construction element, the automated design constraints on the user-defined 3D shape associated with the user-defined toy construction element including one or more of the size of the user-defined toy construction element, the number of coupling elements to be included in the user-defined toy construction element, a volume of the user-defined toy construction element, and a minimum and/or maximum radius of curvature of edges, wherein the automatically implementing one or more automated design constraints comprises enforcing the design constraints by automatically modifying the user-defined 3D shape to comply with said design constraints when it is determined that one or more of the design constraints is not fulfilled;

wherein the generating of the digital representation comprises automatically enforcing the automated design constraints even where the automated design constraints conflict with the proposed user-defined 3D shape of the user-defined toy construction element; and manufacturing the user-defined toy construction element with a 3D printer or additive manufacturing device based on the generated digital representation of the user-defined toy construction element.

2. A method according to claim 1, wherein enforcing the automated design constraints comprises generating a digital representation of a user-defined toy construction element, the user-defined toy construction element having a modified shape determined from the input by the user and from the automated design constraints and comprising said one or more coupling elements at said determined one or more positions.

3. A method according to claim 1, wherein the digital representation is indicative of an element volume to be occupied by a material so as to form the user-defined toy construction element; wherein at least a first automated design constraint associated with a coupling element comprises defining a first volume associated with the coupling element; and wherein enforcing the first automated design constraint comprises generating the digital representation to be indicative of an element volume comprising the first volume.

4. A method according to claim 3, wherein enforcing the automated design constraints comprises generating a digital representation of a user-defined toy construction element, the user-defined toy construction element having a modified volume occupied by a material, the modified volume comprising a union of said user-defined 3D shape and said first volume.

5. A method according to claim 1, wherein the digital representation is indicative of an element volume to be occupied by a material so as to form the user-defined toy construction element; wherein at least a second automated design constraint associated with a coupling element comprises defining a second volume associated with the coupling element;

and wherein enforcing the second automated design constraint comprises generating the digital representation to be indicative of an element volume excluding the second volume.

6. A method according to claim 5, wherein enforcing the automated design constraints comprises generating a digital representation of the user-defined toy construction element, the user-defined toy construction element having a modified volume occupied by a material, the modified volume being determined as at least a difference of said user-defined 3D shape and said second volume.

7. A method according to claim 1, wherein the digital representation is indicative of an element volume to be occupied by a material so as to form the user-defined toy construction element; wherein the method comprises:
obtaining a digital representation of a toy construction model constructed from toy construction elements;
and
defining a third automated design constraint on the proposed user-defined 3D shape, wherein the third automated design constraint comprises determining, from the obtained digital representation, a third volume indicative of a volume associated with at least a part of the toy construction model;
and
generating the digital representation to be indicative of an element volume excluding the third volume.

8. A method according to claim 1, wherein the digital representation is indicative of an element volume to be occupied by a material so as to form the user-defined toy construction element.

9. A method according to claim 1, wherein determining one or more positions for placement of one or more coupling elements to be included in the user-defined toy construction element further comprises selecting, for each of the one or more coupling elements, respective types of coupling elements from a set of types of coupling elements.

10. A method according to claim 1, wherein determining one or more positions for placement of one or more coupling elements to be included in the user-defined toy construction element comprises receiving a user input indicative of a user-selection of one or more coupling elements and corresponding positions, and to place a representation of the selected coupling elements in a three-dimensional view displayed on a display of a data processing system.

11. A method according to claim 1, wherein determining one or more positions for placement of one or more coupling elements to be included in the user-defined toy construction element comprises receiving a user input indicative of a user-selection of a digital representation of one of a number of template construction elements, the template construction element comprising a number of coupling elements positioned at respective predetermined positions.

12. A method according to claim 1, wherein determining one or more positions for placement of one or more coupling elements to be included in the user-defined toy construction element comprises:
obtaining a digital representation of a toy construction model constructed from toy construction elements;
selecting one or more coupling elements of the obtained toy construction model to which a user-defined toy construction element is attachable;
determining said one or more positions for placement of one or more coupling elements to be included in the user-defined toy construction element from the positions of the selected one or more coupling elements of the obtained toy construction model.

13. A method according to claim 12, further comprising determining a type of coupling element associated with each determined position from a detected type of coupling element of the selected one or more coupling elements of the obtained toy construction model.

14. A method of manufacturing a user-defined toy construction element that is connectable to pre-manufactured toy construction elements of a toy construction system, wherein each pre-manufactured toy construction element comprising a number of coupling elements to provide interconnected coupling of the pre-manufactured toy construction element with one or more other toy construction elements of said toy construction system, the method comprising:
generating a digital representation of a user-defined toy construction element by performing the steps of the method defined in claim 1;
and
manufacturing the user-defined toy construction element based on the digital representation.

15. A method according to claim 14, wherein the digital representation is indicative of an element volume to be occupied by a material so as to form the user- defined toy construction element, and wherein producing comprises filling at the element volume by a predetermined material.

16. A method according to claim 14, wherein producing comprises a 3D print process.

17. A data processing system comprising a processor and non-transitory storage medium having stored thereon machine executable instructions for generating a digital representation of a user-defined toy construction element connectable to one or more pre-manufactured toy construction elements of a toy construction system according to the steps of claim 1, wherein said instructions are executed on the processor.

18. A data processing system according to claim 17, comprising a 3D printer configured to produce the user-defined toy construction element based on the digital representation.

19. A non-transitory machine readable media storing a computer program product, the computer product comprising machine executable instructions for generating a digital representation of a user-defined toy construction element that is connectable to one or more pre-manufactured toy construction elements of a toy construction system, wherein each pre-manufactured toy construction element comprising a number of coupling elements to provide interconnected coupling of the pre-manufactured toy construction element with one or more other pre-manufactured toy construction elements of said toy construction system, the instructions for implementing a method comprising:

receiving, from a user to a software design application, input indicative of a user-defined 3D shape of the user-defined toy construction element and receiving input indicative of one or more positions for placement of one or more coupling elements to be included in the user-defined toy construction element, the positions being relative to a coordinate system grid;

automatically restricting the positions of the received input indicative of positions of the one or more coupling elements, by restricting the positions to specific selectable position grid points of the coordinate system grid;

generating, from at least the user input of the 3D shape and the input of the one or more positions of the one or more coupling elements, a digital representation of a user-defined toy construction element, the user-defined toy construction element comprising said one or more coupling elements at said one or more positions;

automatically implementing one or more automated design constraints on the proposed user-defined shape associated with the user-defined toy construction element, the automated design constraints on the user-defined 3D shape associated with the digital representation of the user-defined toy construction element including one or more of the size of the user-defined toy construction element, the number of coupling elements to be included in the user-defined toy construction element, a volume of the user-defined toy construction element, and a minimum and/or maximum radius of curvature of edges, wherein automatically implementing one or more automated design constraints comprises enforcing the design constraints by automatically modifying the user-defined 3D shape to comply with said design constraints when it is determined that one or more of the design constraints is not fulfilled;

wherein the generating of the digital representation comprises automatically enforcing the automated design constraints even where the automated design constraints conflict with the proposed user-defined 3D shape of the user-defined toy construction element; and manufacturing the user-defined toy construction element with a 3D printer or additive manufacturing device based on the generated digital representation of the user-defined toy construction element.

\* \* \* \* \*